United States Patent [19]

Shing et al.

[11] Patent Number: 5,495,610
[45] Date of Patent: Feb. 27, 1996

[54] SOFTWARE DISTRIBUTION SYSTEM TO BUILD AND DISTRIBUTE A SOFTWARE RELEASE

[75] Inventors: Norman Shing, New Hyde Park; Leonid Erlikh, Brooklyn, both of N.Y.; Nicholas R. Lim, London, England; Jeffrey L. Lambert, East Brunswick, N.J.; Joel M. Moskowitz, New York, N.Y.; Vivek K. Wadhwa, Paramus, N.J.; James Hughes, Hartsdale; Elaine C. Power, New York, both of N.Y.

[73] Assignee: Seer Technologies, Inc., New York, N.Y.

[21] Appl. No.: 502,201

[22] Filed: Jul. 13, 1995

Related U.S. Application Data

[63] Continuation of Ser. No. 371,655, Jan. 11, 1995, abandoned, which is a continuation of Ser. No. 684,966, filed as PCT/US90/07011, Nov. 30, 1990, abandoned, which is a continuation-in-part of Ser. No. 444,102, Nov. 30, 1989, abandoned.

[51] Int. Cl.$^6$ .................. G06F 13/00; G06F 15/00; G06F 3/00
[52] U.S. Cl. .................. 395/600; 395/200.08; 395/839; 395/841; 395/182.16; 395/650; 364/DIG. 1; 364/282.1; 364/265.1; 364/274.1
[58] Field of Search .................. 395/600, 200.08, 395/839, 841, 182.16, 650; 364/DIG. 1

[56] References Cited

U.S. PATENT DOCUMENTS

| | | | |
|---|---|---|---|
| 4,455,619 | 6/1984 | Masui et al. | 364/900 |
| 4,479,196 | 10/1984 | Ferrer | 395/600 |
| 4,558,413 | 12/1985 | Schmidt et al. | 364/300 |
| 4,635,189 | 1/1987 | Kendall | 395/600 |
| 4,658,093 | 4/1987 | Hellman | 380/25 |
| 4,714,992 | 12/1987 | Gladnex | 364/200 |
| 4,734,854 | 3/1988 | Afshar | 364/200 |
| 4,751,635 | 6/1988 | Kret | 364/200 |
| 4,788,637 | 11/1988 | Tamaru | 364/200 |
| 4,809,170 | 2/1989 | Leblang et al. | 364/200 |
| 4,833,604 | 5/1989 | Cheng et al. | 364/200 |
| 4,862,345 | 8/1989 | Lekron | 364/200 |
| 4,864,569 | 9/1989 | DeLucia | 371/19 |
| 4,866,638 | 9/1989 | Coseatino et al. | 364/521 |
| 4,888,690 | 12/1989 | Huber | 364/200 |
| 4,893,232 | 1/1990 | Shimaoka et al. | 364/200 |
| 4,894,771 | 1/1990 | Kunii et al. | 364/200 |
| 4,930,071 | 5/1990 | Tou et al. | 364/300 |
| 4,939,689 | 7/1990 | Davis et al. | 364/900 |
| 4,956,773 | 9/1990 | Saito et al. | 364/200 |
| 4,999,806 | 3/1991 | Chernow et al. | 364/900 |
| 5,005,119 | 4/1991 | Rumbaugh | 395/650 |
| 5,005,122 | 4/1991 | Griffin et al. | 364/200 |

(List continued on next page.)

OTHER PUBLICATIONS

Chen, "Entity–Relationship Approach to Information Modeling and Analysis" pp. 361–378, 1981.

*Primary Examiner*—Thomas G. Black
*Assistant Examiner*—Jean R. Homere
*Attorney, Agent, or Firm*—Kenyon & Kenyon

[57] ABSTRACT

A method for creating and electronically distributing a new release of a software program in a computer system having a number of processors is disclosed. One of the software programs is modified. An impact analysis is performed to identify modules to be modified as a result of the modification. A new release of the software program is built by modifying the identified modules. Typically, the new release is built in one or more repositories. The new release is stored in a central storage device. It is determined which processors require a copy of the new release, and the new release is electronically down-loaded from the central storage device to each processor. A down-load complete message is issued at each processor upon completion of the download. An install order is transmitted to each of the processors to which the new release was down-loaded. The new release is installed at each of these processors. The new release can be installed concurrently at each processor. The previous version can be reinstalled if, for example, errors or problems occur.

22 Claims, 7 Drawing Sheets

U.S. PATENT DOCUMENTS

| | | | |
|---|---|---|---|
| 5,008,814 | 4/1991 | Mathur | 364/200 |
| 5,084,813 | 1/1992 | Ono | 395/1 |
| 5,109,486 | 4/1992 | Seymour . | |
| 5,155,847 | 10/1992 | Kirouac et al. | 395/600 |
| 5,202,996 | 4/1993 | Sugimo et al. | 364/274 |
| 5,204,812 | 4/1993 | Kasiraj | 364/419 |
| 5,249,270 | 9/1993 | Stewart et al. | 395/200 |
| 5,287,488 | 2/1994 | Sakata | 395/500 |
| 5,295,222 | 3/1994 | Wadhwa et al. | 395/1 |
| 5,301,270 | 4/1994 | Steinberg et al. | 395/161 |
| 5,307,354 | 4/1994 | Cramer et al. | 371/11.2 |

SOFTWARE DISTRIBUTION SYSTEM TO BUILD AND DISTRIBUTE A SOFTWARE RELEASE

This application is a continuation of application Ser. No. 08/371,655, filed Jan. 11, 1995 now abandoned, which is a continuation of application Ser. No. 07/684,966, filed as PCT/US90/07011, Nov. 30, 1990, now abandoned, which is a continuation-in-part of application Ser. No. 444,102, filed Nov. 30, 1989, now abandoned.

FIELD OF THE INVENTION

This invention relates to multiprocessor computer systems and in particular to the distribution of updated versions of software to particular processors within such systems.

BACKGROUND OF THE INVENTION

Traditionally, there have been two basic hardware configurations employed in the design of computer systems for multiple users. The first of these configurations includes a central processing unit, sometimes referred to as a "mainframe," connected to a plurality of user input/output terminals. Each user input/output terminal is typically comprised of a keyboard for data entry and a cathode-ray tube or printer for data display.

The other of these two basic hardware configurations is comprised of a number of individual processor units or "nodes", one for each user or small group of users, connected in a network. The network, which can serve to connect nodes separated by large geographic distances, allows the sharing of software and data among users. Each node in the system may be connected to one or more input/output terminals. In networks such as this, there may also be an additional node or nodes not dedicated to a particular user which may control one or more centralized databases for storing and retrieving data and software for the various users whose nodes are connected to the network. Furthermore, an additional node may be used by computer system overseers or "operator" personnel who monitor and control the operation of the network. Typically, such additional nodes also have input/output terminals connected to them. This "networked" system of multiple nodes has gained wide acceptance today.

The acceptance of the multinode networked system is generally based upon the proliferation of "micro" or "personal" computers in the business and technical fields. These computers provide each user of a multinode system with dedicated computer power necessary to perform his business or technical functions. With a micro-computer node dedicated to his use, a user can perform his business or technical tasks more efficiently and easily. In addition to dedicated micro-computers, such systems often include mainframes for, among other things, database-related processing, and mini- or super-mini-computers to perform real-time processing.

The software employed in computer systems, whether of the first or second type hardware configuration described above, can generally be classified into one of two main categories. First, there is the so-called "operating systems software." Operating systems software is concerned with controlling the basic operation of a computer processor and/or system for input/output tasks, as well as memory-access tasks. In addition, operating systems software controls the execution of other computer programs. These other computer programs comprise the other main category of software, termed "applications software." Applications software typically performs a specialized technical or business-related function with which a user is concerned.

Software, whether of the operating systems or application variety, is often comprised of many interrelated constituent computer programs. Constituent programs generally form a "software hierarchy" with "executive" programs controlling or directing the operation of "subordinate" programs within the hierarchy. The range of hierarchical structures for software is almost limitless. For example, there can be one or more "executive" programs, each controlling the execution of (or "calling") one or more subordinate programs. These subordinate programs or "subroutines" can call subordinate programs of their own, and so on. There may be many levels of subordinated constituent programs in a hierarchy. Generally, the lower the level of a program in a hierarchy, the more elemental its task or function. Those programs which call one or more subordinate programs generally perform more complex tasks which are, in effect, amalgams of more elemental tasks performed by called subordinate programs. With applications software, there is often more than one hierarchy of programs associated with the application.

Applications software can be thought of as accomplishing a business or technical "function." A function, in turn, is comprised of one or more "processes." It is a "process" which is comprised of one or more hierarchies of programs. Because a program hierarchy is generally responsible for performing a certain task, a process can therefore be viewed as a logical subdivision of a business or technical function.

In the multinode computer system context, an application may be executed on more than one node. When constituent processes of an application execute in a parallel fashion on separate nodes in the system (i.e., simultaneous execution of parts of the application on multiple nodes), the application is said to be processed in a "distributed" fashion. When processes of an application execute in a serial fashion on separate nodes in the system (i.e., execution such that a given node is the only node in the system executing an application process at a given time), the application is said to be processed in a "cooperative" fashion.

In many multinode systems, some of the nodes or groups of nodes are intended to execute identical processes or groups of processes. For example, an airline may find it desirable to have identical software executed on the various nodes which run its application for taking airline reservations. Identical software may be necessary so that the users of the system, the airline reservation clerks or ticket agents, can provide the same services to prospective passengers regardless of which clerk or ticket agent is approached by the prospective passenger.

Often, however, such systems have other nodes which execute distinct processes for distinct purposes. For example, an airline's applications software may not only have a ticketing/reservation process, but also a process useful for tracking baggage. In both the distributed and cooperative processing contexts, specific nodes in the airline's multinode system may perform only the baggage tracking process. Furthermore, it may be useful for some nodes within a system to execute software which performs more than one process. Such nodes would therefore execute the necessary groups of processes. In the above example, these nodes would execute both the ticketing and baggage tracking processes.

As stated above, each application is usually made up of many individual processes comprised of hierarchies of computer programs. Some of the individual processes within a function and some of the individual programs within a process may be shared among several functions and processes, respectively. This overlap most often occurs with lower level processes and programs within software hierarchies. For example, both ticket reservation and baggage tracking functions may require a process or program to write information to a database for subsequent retrieval. Such a process or program may not be dependent on the type of data stored. Thus, both functions may use the same process or program to support the accomplishment of their tasks.

Often, applications software may require alteration because of the need to correct errors in program code or the need to include enhancements to a particular process within an application. However, because many programs share data resources, many processes share programs, and many nodes share processes, a programmer making a needed alteration to a process constituent program or programs is likely unaware of (1) all programs and processes he is affecting by his alteration, and (2) which nodes in the multiprocessor system will require a copy of his updated or altered software program or programs.

Thus, there is a need to determine all programs and processes affected by changes to individual programs so that particular nodes which execute the affected processes can be identified. In addition, there is the need to physically distribute the updated versions of programs to the individual nodes of the network which execute the affected processes. In the past, these needs were accomplished by an individual or individuals who manually determined all programs and nodes affected by program alterations and the identity of the nodes in the system which executed the affected processes. Furthermore, Such individuals had to physically transport updated versions of the programs generally stored on a computer disk (typically a "floppy disk") or tape, to the individual nodes for loading into associated memories. Even for small networks, where nodes are located in relatively close proximity to each other, the determination of affected programs and processes and the installation of updated versions of processes can be cumbersome at best. But, with larger, more complex networks executing many applications having many functions and processes, and with the possibility of large geographic distances between nodes in such networks, the difficulties associated with determining all affected processes and the logistical problems associated with the physical distribution of updated software can be highly burdensome, if not impossible as a practical matter.

SUMMARY OF THE INVENTION

These problems are solved by the present invention which is a software distribution system (SDS) for distributing software programs to particular nodes in a multinode system. One aspect of the SDS is a relational database which contains information which relates an application to its associated data entities and its associated processes, and which relates processes to individual nodes in a multinode computer network, whether of the distributed or cooperative type. Another aspect of SDS further provides a processing means (or node), associated with the database, for determining each program and process affected by an alteration to a program and the identity of all nodes in the network which execute the affected processes. SDS also provides a warehouse database for storing software to be distributed, and a distribution channel for delivering any altered programs to identified nodes within the multinode network.

The database aspect of SDS is built according to an entity-relationship model which defines certain logical entities and relationships among such entities. These entities specify the elements of a multinode system, including its hardware, software and data. The entities provided by the database portion of SDS include "Workstations" (which are nodes and associated input/output devices), "Processes," "Programs," "Data," and "Releases" (which are logical units of work to be distributed by SDS). The relationships among entities are also defined by the database of SDS and include a "Workstation to Process" relationship, associating a node to a Process to which it has access; a "Release to Process" relationship, associating a given Release with a given Process; a "Release to Program" relationship, associating a given Program with a given Release; and a "Release to Data" relationship, associating a given Release with given Data.

The processing means aspect of SDS using the above described database operates to determine all entities which are affected by an update or change to a given program or data. Either the same or another processing means controls the transmission of identified software or data from the warehouse database to the appropriate Workstations for installation thereon.

BRIEF DESCRIPTION OF THE DRAWINGS

FIG. 3c is a diagrammatic representation of a portion of the contents of a database constructed according to an entity-relationship model illustrated in FIG. 3a.

DETAILED DESCRIPTION OF THE INVENTION

Figure 1:
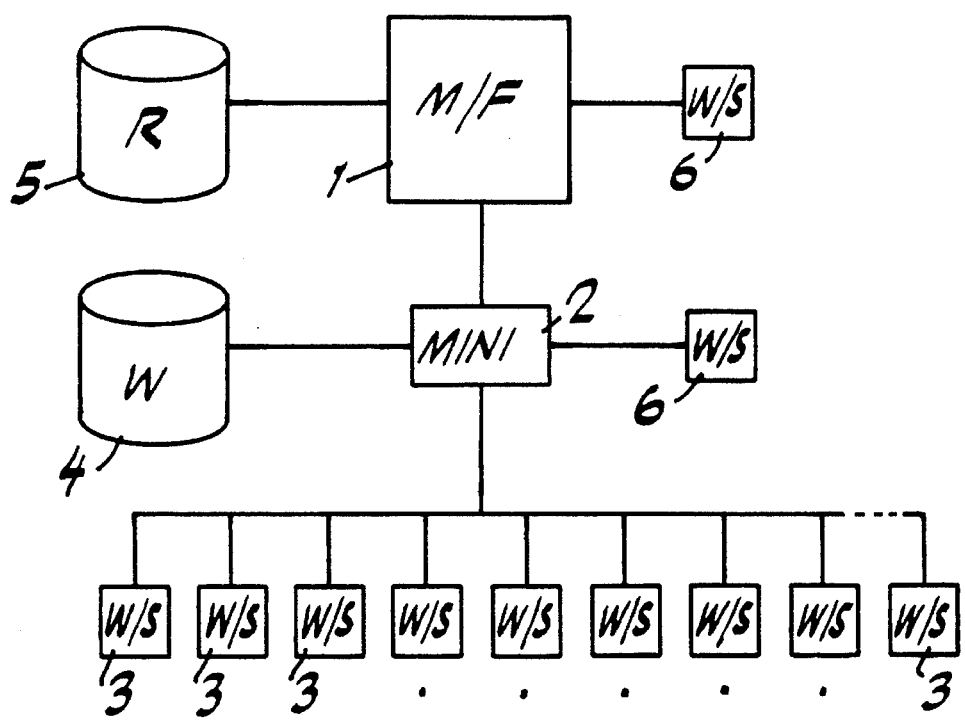
FIG. 1 is an illustration of a three-tiered computer system.
Figure 2:
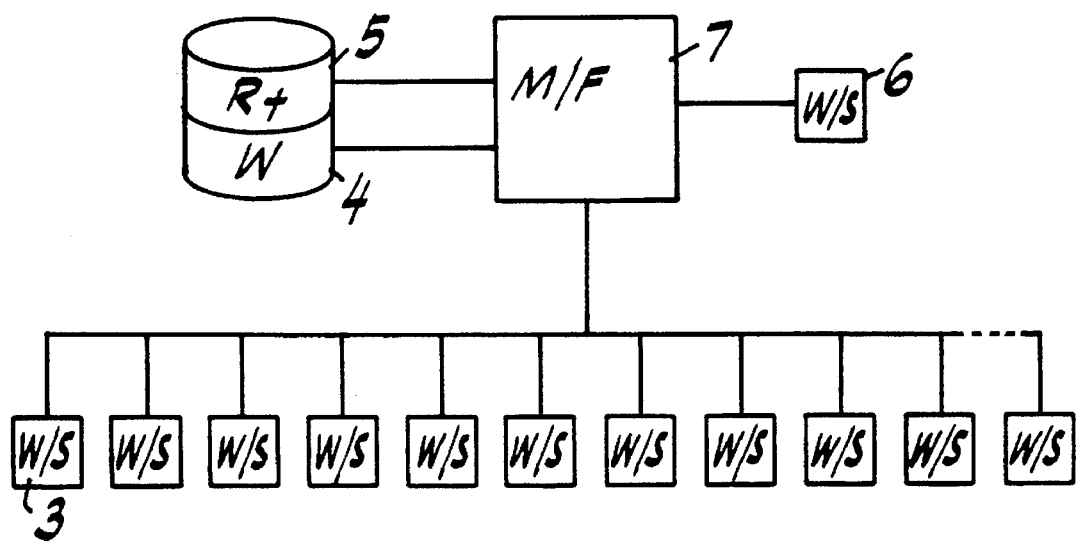
FIG. 2 is an illustration of a two-tiered computer system.

Typical hardware configurations for computer systems employing the present software distribution system invention (SDS) are depicted in FIGS. 1 and 2. FIG. 1 depicts a "three tiered" computer system, so named for its three levels of computer processors or "hardware platforms." A "three tiered" system can be comprised, for example, of a mainframe computer 1, a mini- or super-mini-computer 2, and micro-computers and their associated input/output devices, collectively referred to as "workstations" 3.

Typical processors preferred for each of these tiers are the IBM mainframe sold under the trademark "Model 3090", running the IBM MVS/XA operating system; the Stratus mini-computer sold under the trademark "Model XA2000", running the Stratus Computer, Inc. VOS operating system, and the IBM micro-computer sold under the trademark "PS2", executing the Microsoft Corporation operating system sold under the trademark "MS-DOS." (For further information on these processors or their operating systems, the reader is referred to the "IBM System/370 Bibliography", document number GC20-0001; the "IBM Technical Directory", document number 6024448; and "Introduction to VOS", by Stratus Computer, Inc., document number R0001.)

Each of these processors and workstations is a node in the network. The mainframe computer 1 is connected to and performs all processing associated with a database 5, referred to as the "Repository." The Repository 5 is used to store a description of an application in terms of an SDS Entity-Relationship Model discussed below. The mainframe 1 may also be connected to a microcomputer with an input/output (I/O) device 6 (i.e., a workstation), or simply an input/output device. In either case, the purpose of this connection is to allow a human to access the Repository 5, as well as control mainframe 1 processing. The mini-computer 2 is connected to the mainframe 1 and to a database of its own, referred to as the "warehouse" 4. The warehouse 4 is used to store all versions of all software programs and data which comprise a given application. Like the mainframe 1, the mini-computer 2 may also have a workstation or I/O device 6 for human access to the warehouse 4 and to control mini-computer 2 processing. The mini-computer 2 is further connected to a one or more workstations 3. The computer system (or network) can have as many workstations 3 as would be desired to support user access to given applications software.

FIG. 2 depicts a "two tiered" computer system, so named for its two distinct levels of hardware platforms. Unlike the three tiered system, the two tiered system includes only one platform in addition to its workstations 3. Typically, the two tiered system includes a mainframe 7, performing the work of both the mainframe 1 and mini-computer 2 of the three tiered system depicted in FIG. 1. The mainframe 7 of the two tiered computer system is connected to both a Repository database 5 and a Warehouse database 4, as well as a workstation or I/O device 6 for database access and processor control. As mentioned, the mainframe 7 is connected to a network of workstations 3. However, a processor of another type could substitute for the mainframe processor 7 in the two tiered system, depending on specific through-put requirements and equipment availability. As is the case with the three tiered system, the processor and workstations of the two tiered system are nodes in the network.

Regardless of whether the computer system of FIG. 1 or FIG. 2 is employed for the distribution and execution of applications software, the software and data to be distributed is maintained in the warehouse 4. This software and data may be stored in executable form or in a source code format. The information necessary to properly distribute such software is maintained by Repository 5, with the mainframes 1, 7 executing software necessary to determine what software must be distributed. Generally, the nodes which will receive software distributed by SDS are the workstations 3. However, such workstations 3 could be replaced by other nodes of the mainframe or mini-computer variety, themselves connected to other nodes in a network. Thus, the SDS is not limited to the distribution of software solely to microcomputer-based workstations. Rather, SDS is suitable to distribute software and data to any node in the network. However, for clarity of explanation, this description will refer to all nodes in a system which are to receive distributed software and data as Workstations.

The SDS Entity-Relationship Model

As indicated above, all information necessary to properly distribute updated portions of applications software (i.e., a Release) to the appropriate Workstations 3 in the network is maintained by the Repository 5, which is a special-purpose relational database.

A "relational database" is a term used to described a computer program which carries out the storage, searching and retrieval of data on a mass storage medium, such as a disk storage system. "Relational database" is also used to describe information stored on a disk storage system by a relational database program. A relational database program stores, searches and retrieves data according to specific commands from the database user. That is, with a relational database, a user specifies the data to be stored, the searching (or "traversing") of the database to be performed, and what is to be retrieved by the database program. Relational database programs are well known and are available commercially. For purposes of a preferred embodiment of this invention, it is preferred that the IBM relational database sold under the trademark "DB2" be employed. (For more background information on DB2, the reader is referred to the following IBM publications which are hereby incorporated by reference: "IBM DATABASE 2 Introduction to SQL" (document number GC26-4082); "IBM DATABASE 2 Reference" (document number SC26-4078); "OS/VS2 TSO Command Language Reference" (document number GC28-0646); "TSO Extensions Command Language Reference" (document number SC28-1307); "Interactive System Productivity Facility/Program Development Facility for MVS: Program Reference" (document number SC34-2089); "Interactive System Productivity Facility/Program Development Facility for MVS: Dialog Management Services" (document number SC34-2137); and "DB2 Application Programming Guide for TSO and Batch Users.")

The Repository 5 maintains information on all elements of a computer system which are necessary for software distribution, as well as all necessary interaction among computer system elements. These elements (or "entities") and their interactions (or "relationships") are defined generally by an SDS Entity-Relationship Model, which is the basis of information organization in the repository 5. The SDS Entity-Relationship Model thus provides the basis for all commands to a relational database program. The Model supplies the intelligence needed to create and maintain the Repository 5 via the relational database program, which is only a tool in the context of the present invention.

The "entities" of the Model represent something real or abstract about which information is recorded in the Repository 5. This information is organized into a set of characteristics known as "attributes." Entities which share a common set of attributes are grouped into classes called "entity types." An "entity instance" is a specific occurrence of an entity type and is described by a set of specific attributes.

The "relationships" of the SDS Entity-Relationship Model specify an association between entities. Like entities, relationships are described by their attributes. Relationships with common attributes are referred to as "relationship types," while a "relationship instance" is a specific occurrence of a relationship type and is described by a set of specific attributes.

The SDS Entity-Relationship Model therefore provides a representation of the overall logical structure and elements of software generally in terms of specific entity and relationship instances definable through the Model.

The entity types of the SDS Entity-Relationship Model are as follows:

—"Workstations," which describe the physical workstations to which software must ultimately be distributed;

—"Workstation Groups" which describe logical groupings of workstations;

—"Release," which describes the logical unit of work to be distributed by SDS;

—"Function," which describes a given application software package;

—"Process," which describes a logical subdivision of a function;

—"Program," which describes an individual software routine, either executive or subordinate, which forms a portion of a process;

—"Data Entity," which describes a collection of data values which are necessary for the operation of a program;

—"Value," which describes a single static data item literally (either in integer, decimal or character formats).

The attributes associated with these entity types include an attribute which identifies discrete instances of such entities. Thus, the Repository 5 contains information identifying each Function, and each constituent Process, Program, and Data Entity, as well as each Workstation Group and Workstation, comprising the hardware and software of a given computer system.

In addition to an identifier attribute, certain entity types have associated with them additional attributes. Function attributes also include an Application ID attribute, which specifies the Applications Software in which a given Function instance is used. Program attributes also include an Execution Environment attribute, which specifies the hardware platform on which a given Program instance executes. Value attributes include the numerical value of a given datum.

In addition to entities and their attributes, SDS defines certain relationships among entities. These relationships are also incorporated in the SDS Entity-Relationship Model depicted in FIG. 3a. The first of these is the "Refines" relationship 42. Refines 42 is used to describe the decomposition of Functions 41 into Processes 43. The highest level or executive Process is known as a "Root" Process (so known because other Processes branch out from it). Refines 42' is also used to describe the decomposition of a Root Process into intermediate and lowest level Processes, known as "Node" and "Leaf" Processes, respectively. When used to describe the decomposition of Functions 41 into Processes 43, Refines 42 represents the first step in the step-wise refinement of Functions 41 into executable Programs 46. When used to describe the decomposition of a highest or higher level Process 43 into a lower or lowest level Process 43, Refines 42' represents a further step in the same stepwise refinement.

The attributes associated with the Refines 42, 42' relationship include the identification of the "participants" in the relationship. Specifically, there is the "First Participant" attribute, which identifies the Function/Process instances being refined, and there is the "Second Participant" attribute, which identifies the Process instance immediately subordinate to the First Participant.

Another of the relationships defined by SDS and incorporated into the SDS Entity-Relationship Model is "Defines" 44. The Defines relationship 44 is used to describe the relation between a Process 43 and a Program 46. Specifically, the relationship connects an instance of the lowest level Process 43 (Leaf Process) to a Program 46. Generally, the Program 46 specified by the Defines relationship 44 is the highest level Program in the Leaf Process, and is known as a "Root" Program. Defines 44 represents yet another step in the refinement of Functions 41 into Programs 46.

The attributes associated with the Defines relationship 44 include the identification of participants in the relationship. The First Participant attribute identifies the Leaf Process instance being defined, and the Second Participant attribute identifies the highest level or Root Program instance of the Leaf Process.

Another of the relationships defined by SDS and incorporated into the SDS Entity-Relationship Model is "Uses" 45. The Uses relationship 45 describes the relation between one Program 46 and another. Uses 45 relates a higher or highest (Root) level Program to a subordinate Program. It provides for the further stepwise refinement of Functions 41 into Programs 46.

The attributes associated with the Uses relationship 45 include the identification of the participants in the relationship. The First Participant attribute identifies the highest or higher level Program instance using the Second Participant attribute, the lower level Program instance.

A further relationship defined by SDS and incorporated into the SDS Entity-Relationship Model is "Refers" 47. Refers 47 is used to describe the relationship between a Program 46 and an external Data Entity 48. A Program 46 may Refer 47 to a Data Entity 48 by making a local declaration statement within the Program 46 to the Data Entity 48.

The attributes associated with the Refers relationship 47 include the identification of the participants in the relationship. The First Participant identifies the Program instance requiring a reference to the Data Entity instance. The Second Participant is the common identifier name for a collection of data Values, i.e., the Data Entity instance.

Another of the relationships defined by SDS and incorporated into the SDS Entity-Relationship Model is "Members" 49. The Members relationship associates a Data Entity 48 to its individual member Values 50.

The attributes associated with the Members relationship 49 include the identification of the participants in the relationship and a Symbol Name for the Second Participant. The First Participant attribute identifies the common identifier name for the group of data Values (i.e., the Data Entity instance). The Second Participant attribute is an individual Value of data. The Symbol Name attribute is a symbolic name which can be used to refer to the Value of data identified by the Second Participant, without using the Value itself.

Another of the relationships defined by SDS and incorporated into the SDS Entity-Relationship Model is "Workstation Group To Process" 51. This relationship associates a Workstation Group 52 to the Process 43 to which it has access.

The attributes associated with the Workstation Group to Process relationship 51 include the identification of the Participants in the relationship. The First Participant attribute identifies a Process instance. The Second Participant attribute identifies the Workstation Group instance having access to the First Participant.

Another of the relationships defined by SDS and incorporated into the SDS Entity-Relationship Model is "Workstation To Workstation Group" 53. The Workstation To Workstation Group relationship 53 defines the association between a Workstation 54 and the Workstation Group 52 to which it belongs.

The attributes associated with the Workstation To Workstation Group relationship 53 include the identification of the participants in the relationship. The First Participant attribute identifies the particular Workstation Group instance in question. The Second Participant attribute identifies the Workstation instance belonging to the First Participant.

Should a given applications software processing system not employ identifiable groups of workstations, or, should it be undesirable to have identifiable workstation groups, the Repository 5 would not need the entity of Workstation Groups, nor the specific relationships of Workstation Group to Process or Workstation to Workstation Group. Rather, all that the Entity-Relationship Model of the Repository 5 would maintain would be a "Workstation to Process" relationship.

The attributes associated with the Workstation to Process relationship include the participants in the relationship. The First Participant attribute identifies a Process instance. The Second Participant attribute identifies the Workstation instance having access to the First Participant.

Figure 4:
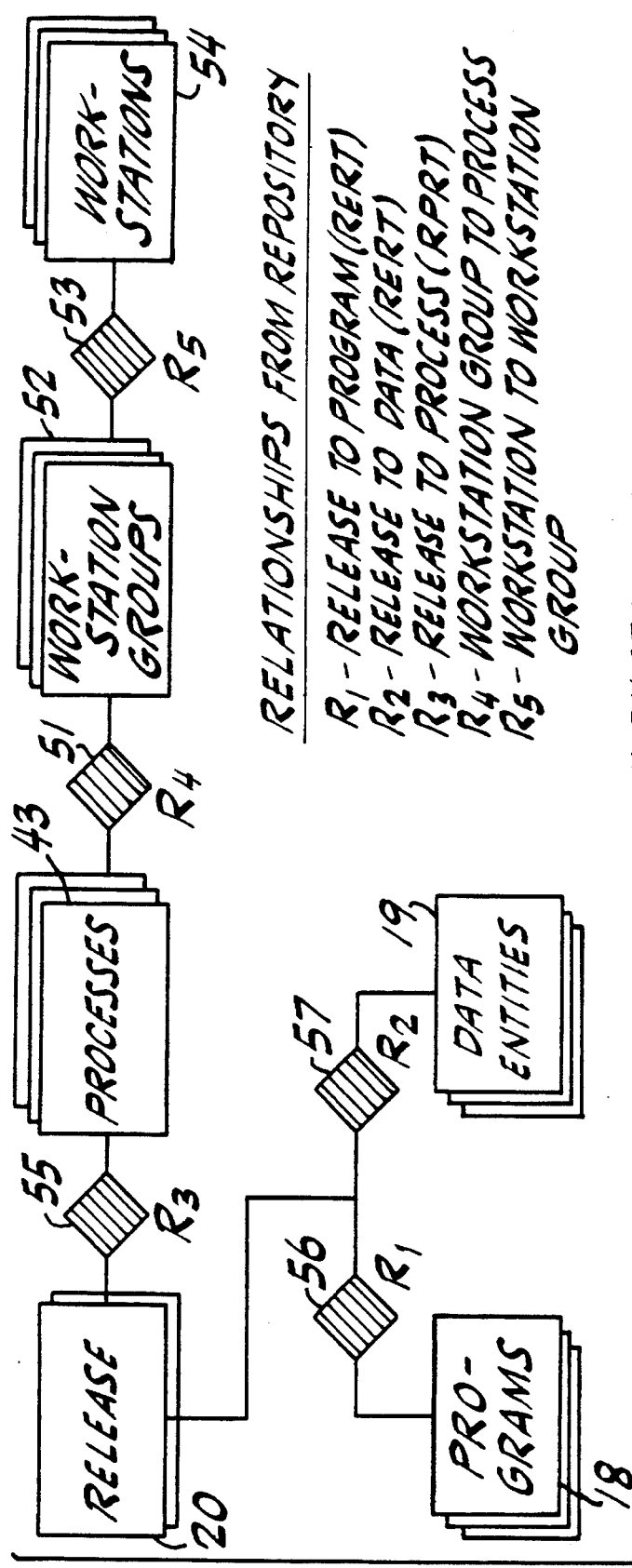
FIG. 4 is a diagrammatic representation of the entity and relationship instances associated with a release, as well as the migration path of modified entity instances being distributed.
Figure 4:
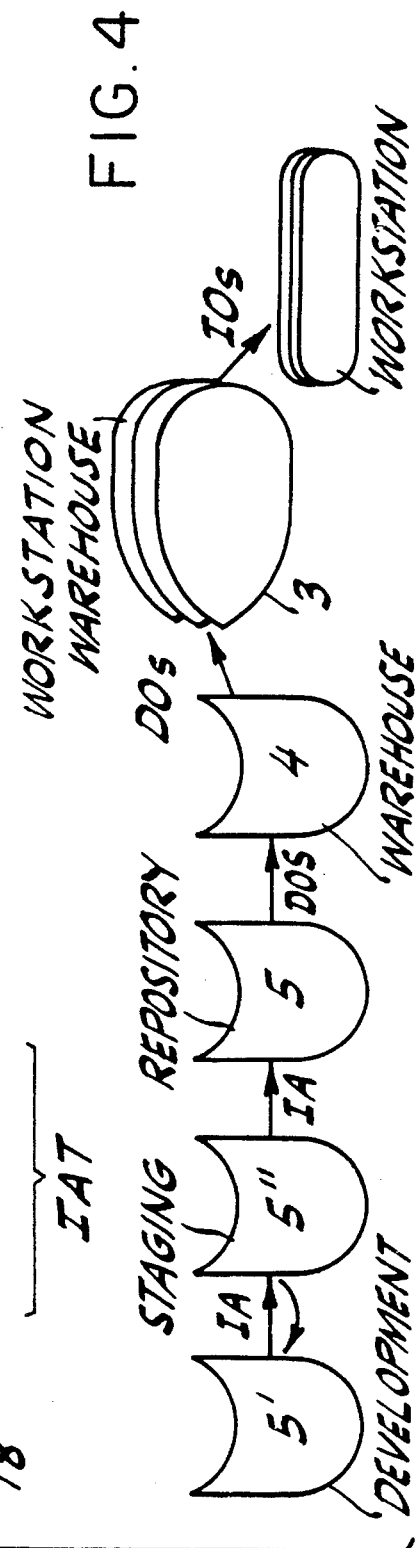

Another of the relationships defined by SDS and incorporated into the SDS Entity-Relationship Model and referenced in FIG. 4 is "Release To Process" 55. The Release To Process relationship 55 associates a Release 20 with a Process 43 affected by the Release 20.

The attributes associated with the Release To Process relationship 55 include the participants in the relationship. The First Participant attribute identifies the Release instance in question. The Second Participant attribute identifies a Process instance affected by the First Participant.

Yet another of the relationships defined by SDS and incorporated into the SDS Entity-Relationship Model is "Release To Program" 56. The Release To Program relationship 56 associates a Program 18 to be distributed by SDS in a particular Release with the Release 20 itself.

The attributes associated with the Release To Program relationship 56 include the identification of the participants in the relationship. The First Participant attribute identifies a Release instance. The Second Participant attribute identifies a given Program instance to be distributed by SDS by the particular Release instance identified by the First Participant. Other attributes of the Release To Program relationship 56 include a Program's Logical File Name. A Logical File Name is a function of both a Physical File Name (discussed below) and a Release name. It allows different Releases to refer to different versions of the same entity. Other attributes include a Physical File Name and a Path Name. A Physical File Name refers to a block of executable code, and is an input to the Logical File Name generation process. A Physical File Name will usually be the same as the name of the entity (i.e., the identification attribute of an entity instance), but can further include extensions should a given Program be comprised of more than one file of executable code. A Path Name refers to a high level portion of a disk address at a particular workstation where software will be stored once distributed and installed.

Another of the relationships defined by SDS and incorporated into the SDS Entity-Relationship Model is "Release To Data" 57. The Release To Data relationship 57 is used to identify a Data Entity 19 to be distributed by SDS in a particular Release with the Release 20 itself.

The attributes associated with the Release To Data relationship 57 include the identification of the participants in the relationship. The First Participant attribute identifies the Release instance. The Second Participant attribute identifies a Data Entity instance to be distributed by SDS for the particular Release instance identified by the First Participant. Other attributes of the Release to Data relationship include a Data entity's Logical File Name which, as discussed above, is a function of both a Physical File Name and a Release Name. As with the Release to Program relationship 56, attributes of the Release to Data relationship 57 include a Data Entity's Physical File Name and Path Name.

Depending upon the overall nature of the computer system in which SDS is employed, it may be useful to define additional entities and relationships tailored to the system. For example, if there are particular or special types of programs defined for use in a certain computer system, entity types corresponding to these program types can be adopted for use in the Repository 5.

Special Entities and Relationships Defined by the SDS Entity-Relationship Model

Often in various software applications in the business and technical fields, there are special program, I/O, and data related entities and relationships which serve to enhance the operation and efficiency of software. For instance, in the field of Computer-Aided Software Engineering (CASE), which concerns specialized computer software which aids in the design and/or coding of applications programs, special program types, data and interactions among programs and data exist. Therefore, where CASE and other special software is concerned, the SDS Entity-Relationship Model takes account of special program types, data and interactions by further providing SDS entity and relationship types tailored for use with this special software.

The first of these entities is the "Rule." A Rule is a special type of Program which provides the procedural specifications of the logic for a portion of a Process. In addition, a Rule can control, among other things, the execution of other Rules. Rules themselves are generally specified in a high level language referred to as "Rules language." Rules language is typically not executable source code, but rather "pseudocode" which in some ways resembles English and which can be readily translated into one of the many available computer source code languages. Rules language is based on the principles of structured design and programming. Thus, with the Rules language, a designer of applications software can design Rules pseudocode to perform such structured constructs as "Do While," "Do Until," and "If, Then, Else," for example. Rules and the Rules language make it generally possible for an applications software designer to design software without concern for the specific language which may be required by a specific processor node. This capability can be particularly useful in cooperative and distributed processing systems where an application may be executing on several disparate nodes which employ various source code compilers.

The attributes associated with the Rule entity type include an attribute for the identification of discrete instances of Rules, as well as an attribute specifying execution environment for the Rule instance.

A second entity defined for CASE (or other special) software is the "Component." A Component is a block of computer instructions written in a source code programming language. Components are used to perform the functions not handled by Rules.

The attributes associated with Components include an attribute for the identification of discrete instances of Components, an attribute specifying execution environment for the Component instance, and an attribute specifying the source code language in which a Component instance is written.

The next of these entities is the "Window." Windows are a type of Program which define the man-machine interface.

They specify what data is to be accepted from a user, how it is to be displayed, and how it is to be accepted. In designing an application or portion thereof for execution on an "IBM PC," it is preferred that the Microsoft Corporation's Window program, sold under the trademark "MICROSOFT WINDOWS," be used. (For more background information on MICROSOFT WINDOWS, the reader is referred to the following Microsoft Corporation publications which are hereby incorporated by reference: "Microsoft Windows Programmer's Utility Guide"; "Microsoft Windows Application Style Guide"; "Microsoft Windows Programmer's Reference"; and "Microsoft Windows Quick Reference.")

The attributes associated with Windows include an attribute identifying discrete Window instances.

For most systems, the only nodes capable of executing Window entities are the Workstations, since they will usually be the only platforms which comprise a cathode-ray tube display in addition to a processor. As such, there is usually no need for an attribute describing the execution environment of the Window. However, should a particular computer system be configured to include cathode-ray tube displays connected to mainframe or mini-computer nodes, the SDS Entity-Relationship Model can be adapted to include for the Window entity the additional attribute of execution environment.

A further of these entities is a "View." A View is a logical collection of data elements (or "Fields" as described below). A view can also comprise other Views. Essentially, a View is a multiplicity of data variables (or Fields—see below) and is particularly useful for defining the data interface between one program and another or from a system user to a program. The former type is referred to as a "Module View" and the latter is referred to as a "Window View".

The attributes associated with Views include an identification attribute specifying discrete View instances.

Another of these entities is a Field. Fields describe the basic data elements that comprise a business or technical data resource. A Field stores all information about data elements independent of the environment in which the data is actually stored.

The attributes associated with Fields include an identification attribute, for specifying discrete Field instances; a Field Format attribute, for describing the format in which data is stored in memory (e.g., integer, decimal, character, etc.); and a Field Length attribute, for specifying the size (or length) of a Field.

Figure 3A:
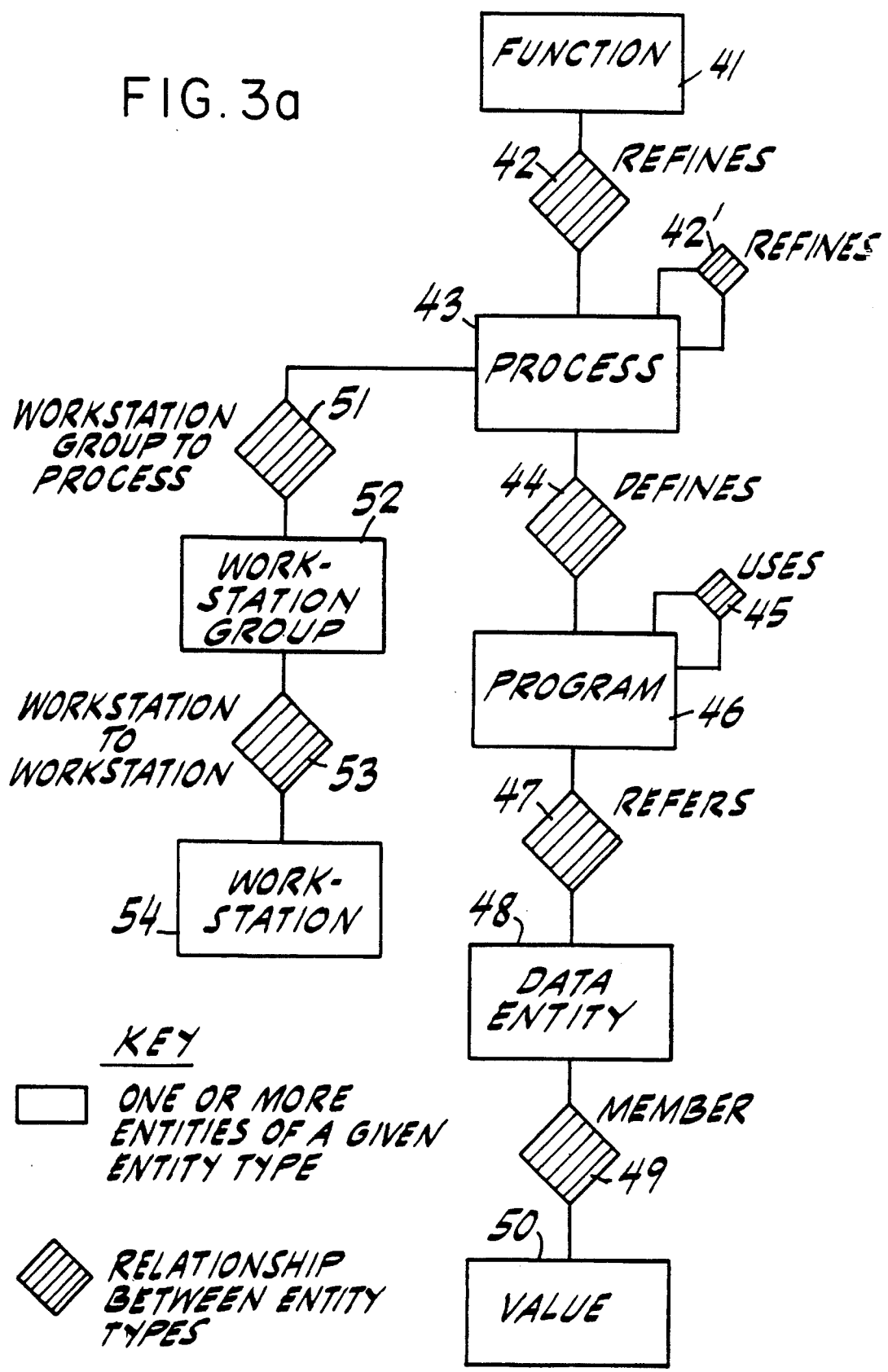
FIG. 3a is a diagrammatic representation of an entity-relationship model according to the present invention.
Figure 3B:
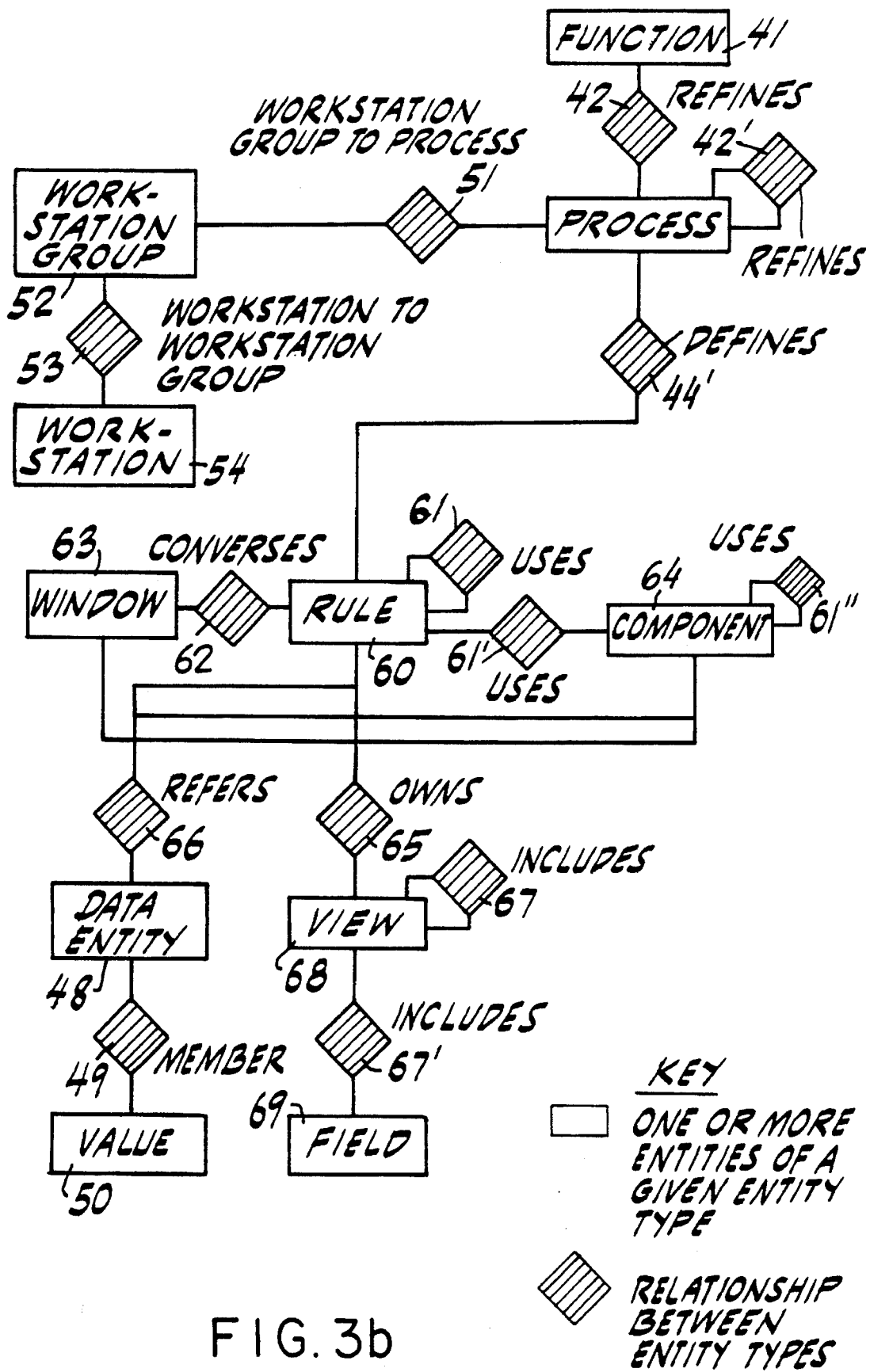
FIG. 3b is a diagrammatic representation of an entity-relationship model according to the present invention.

For applications designed with certain CASE software, the higher level entities and relationships still apply (see FIG. 3b). That is, the Function 41 and Process 43 entities, as well as the Refines 42, 42' and Defines 44' relationships, are a part of the SDS Entity-Relationship Model and are used to described a software application in the Repository 5. The only difference is with respect to the Defines relationship 44' which in the CASE context is used to describe the relation between a Process 43 and Rule 60.

The attributes of the Refines 42, 42' and Defines 44' relationships are the same as defined previously.

The Uses relationship defined previously to describe the relationship between Programs is used in the CASE context to describe the relationship between two Rules (61), a Rule and a component (61'), and two Components (61"). (It is preferred that a component not Use a Rule ) The attributes of the Uses relationship 61, 61', 61" are as defined previously. In the CASE context, it is preferred that a Component not be a First Participant unless another Component is a Second Participant in the relationship.

A relationship not previously defined is "Converses" 62. Converses 62 is used to describe a Rule 60 connecting to a Window 63. (It is preferred that a Rule Converse with only one Window). Only those Rules which are resident in a node with an I/O device including a cathode-ray tube may Converse with a Window.

The attributes of the Converse relationship 62 are the First and Second Participants. The First Participant attribute identifies the Rule instance in question, while the Second Participant Attribute identifies its Window instance.

The "Owns" relationship 65 is used to connect Rules 60, Components 64 and Windows 63 with Views 68, thereby associating with a Rule 60, Component 64 or Window 63 a specific data interface.

The attributes of the Owns relationship 65 are the First Participant, the First Participant's entity type, the Second Participant, and the View Usage. The First Participant attribute can be a Rule, Component or Window name (i.e., the identification attribute for a certain Rule, Component or Window instance). The First Participant's entity type attribute will specify Rule, Component or Window. The Second Participant attribute will be the identification attribute for the View instance participating in the Owns relationship 65. The View Usage attribute will specify a directionality to a View ("In" for an Input View and "Out" for an Output View for Rules and Components; "InOut" (bidirectional View for Windows as well as Rules and Components).

The "Includes" relationship 67 is used to nest a View within another View, or to connect a View with its constituent Fields (67'). A View 68 may therefore Include a View 68 or a Field 69.

The attributes associated with the Includes relationship 67, 67' comprise the First Participant attribute (which is the View instance in question); the Second Participant attribute (which is either the nested View's or Field's identification attribute), the Second Participant's entity type (which would either be View or Field); the Sequence Number attribute (which indicates for a View that has nested Views and Fields the order of nested Views and Fields); and the Occurs Number of Times attribute (which indicates how many associations there are between the First Participant View and Second Participant Views; this attribute will be zero for Views which Include only Fields).

Note that the Refers relationship 66 is similar to the Refers relationship 47 (see FIG. 3a) in the general Model, but it associates either Rules 60 or Components 64 to a Data Entity 48. As such the First Participant attribute in this relationship may include the identification attributes from either the Rule or Component instance in question.

Application of the SDS Entity-Relationship Model to Specific Software and Hardware Configurations The application of the above-defined SDS Entity-Relationship Model to specific software and a computer system requires that the specifics of the software and the system be identified to the Repository 5 according to the specifications of the Model. That is, when designing a new application, a programmer can store in the Repository 5 a description or representation of the application and hardware as instances of the entity and relationship types provided by the Model. (For purposes of consistency, both the actual software and hardware of a computer system and the representation of such software and hardware on the Repository 5 will be referred as "entity instances." It will be clear from the context of discussion which is being referenced, actual software and hardware or their representation in the Repository 5. "Instances" are to be distinguished from "types", which form the SDS Entity-Relationship Model as discussed above).

When updates to an application are made, the Repository 5, containing specific entity and relationship instances descriptive of the application and the related hardware, can be examined by SDS to determine information required for software distribution.

However, the SDS Entity-Relationship Model described above has been designed to provide not merely for entity and relationship types which are required for software distribution, but also a structure useful for orderly and logical applications software design. The design of the SDS Entity-Relationship Model thus achieves great efficiency since for a given software application the entity and relationship instances useful for software distribution can in fact be stored in the Repository 5 as a natural consequence of software design, requiring little or no further refinement for software distribution purposes. This feature of the SDS Entity-Relationship Model can be quite useful when combined with CASE software designed for Entity-Relationship Model compatibility. Thus, with an automated and compatible CASE tool, a designer can design software and build entity and relationship instances in the Repository useful for software distribution at the same time.

The SDS Entity-Relationship Model is equally applicable to facilitate software distribution of applications written without the Model in mind. The structure of the SDS Entity-Relationship Model is generic enough to describe the specifics of any application. All that need be done is to logically describe an existing program and computer system in terms of the categories of entities and relationships provided by the Model. Once this is done, the specific instances of such entities and relationships are stored in the Repository 5 for future use in the distribution of modified software entity instances.

Regardless of which system is employed to develop the entity and relationship instances for a given application, the result of such development is a Repository 5 containing a representation of entity and relationship information. This information is illustrated by way of example in FIG. 3c. Regarding the instances of entities, note that a given application or Function instance 8 is logically composed of a highest level or Root Process instance 9, which intern is comprised of one or more lower level Process instances 10, 11. The lowest level Process instances 11 are each comprised of a highest level or Root Program instance 12, which may call one or more subordinate Program instances 13. Each of the subordinate Program instances 13 may in turn call other subordinate Program instances 14, and so on. Any of the Program instances may have access to or need for Data Entity instances 15 which comprise individual data Value instances 16. The relationship instances among the entity instances are indicated in the Figure.

Leaf Processes are the only Processes which directly relate to one or more programs/data entities. All other Processes (for example Root and Node Processes) are merely logical combinations of Leaf Processes. Furthermore, a Function is merely a collective term for the logical organization of processes. For the purposes of software distribution, no description of software entity and relationship instances above Leaf Processes in a given software application is required. However, such higher level software entities (Function, Root and Node Processes) and their associated relationships are useful in conjunction with software design efforts (referenced above) and could be present in such software entity instance representations stored in the Repository 5.

Figure 3C:
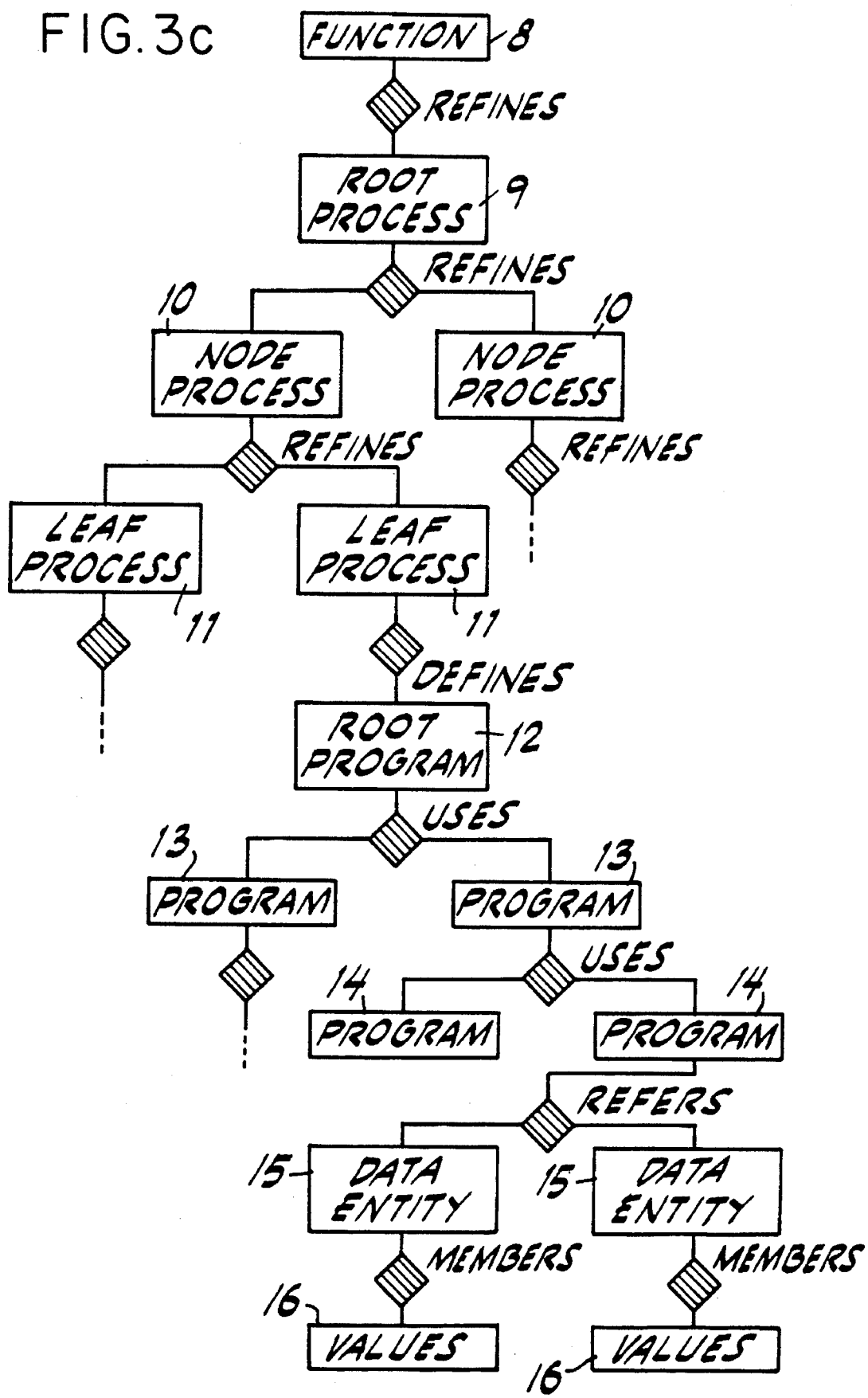

Regarding relationships depicted in FIG. 3a, note that in FIG. 3c each interconnection between software entity instances is represented by one of the Refines, Defines, Uses, Refers or Members relationship instances.

For a given representation of applications software entity instances stored on the Repository 5, the specifics of each entity instance are recorded in the Repository 5. The Repository 5 as shown in FIG. 3c, for example, contains entries not only for the identification of each entity instance, but for all attributes pertinent to that entity type. For example, stored are the identification attributes of each Program instance comprising the application, as well as each Program and Data Entity instance's execution environment. Furthermore, stored are the specifics of each relationship instance between entity instances, for example, the identity of each participant in a given relationship. In this way, any application can be completely described.

Besides containing a representation of a software application in terms of software entity and relationship instances, the Repository 5 also contains a representation of computer system hardware in terms of instances of Workstation and Workstation Group entity types and their associated relationships. In addition, there is a description of which Workstation/Workstation Group instances have access to Leaf Processes instances. This description is provided by the Workstation Group to Process (or Workstation to Process) relationship defined by the SDS Entity-Relationship Model.

Figure 3D:
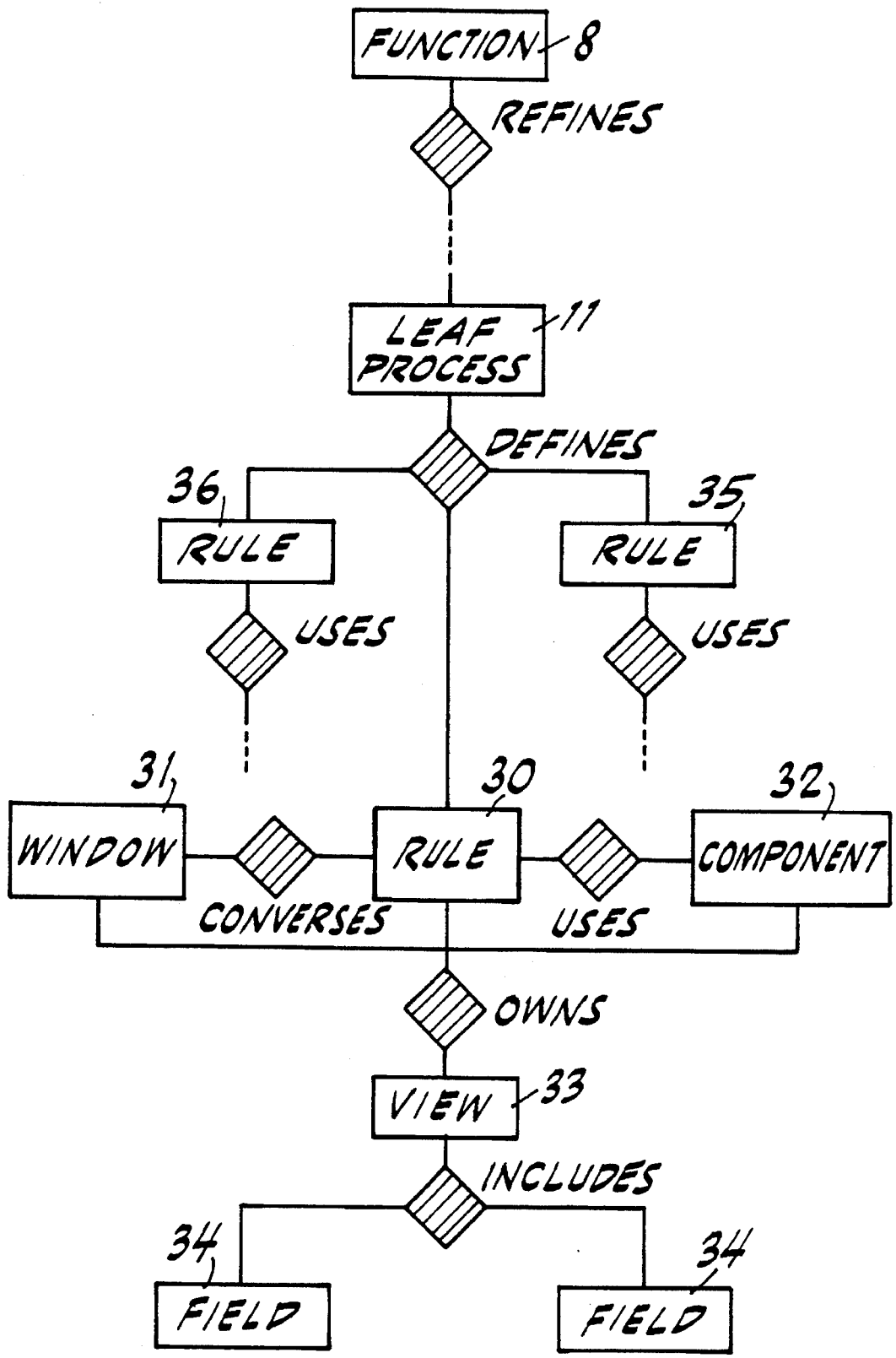
FIG. 3d is a diagrammatic representation of a portion of the contents of a database constructed according to an entity-relationship model illustrated in FIG. 3b.

If the special entities and relationships which are useful with CASE and other software are considered, a more detailed Repository 5 will be created. FIG. 3d depicts a portion of an exemplary Repository 5 where program instances are replaced by Rule instances 30, 35, 36, a Component instance 32 and a Window instance 31, and where specific data interfaces defined by a View instance 33 and Field instances 34 are included. Note that a View instance 33 and Field instances 34 do not replace or eliminate the need for the Data Entity instances and Value instances or their associated relationships. Data Entity instances and Value instances have been omitted from FIG. 3d for clarity.

As indicated by FIG. 3d, Window 31, Rule 30, 35, 36 and Component 32 instances can share ownership of a View instance 33. However, Rule 30, 35, 36 and Component 32 instances may have unshared multiple View instances in addition to one which may be shared. Also, as indicated in FIG. 3d, a given View instance 33 may Include more than one Field instance 34.

As is the case with the software entity and relationship instances stored in the Repository 5, the hardware entity instances and the hardware to software relationship instances are stored in the Repository 5 as part of the application software design process, or as part of the process of describing an existing application and system in terms of the SDS Entity-Relationship Model.

Figure 3E:
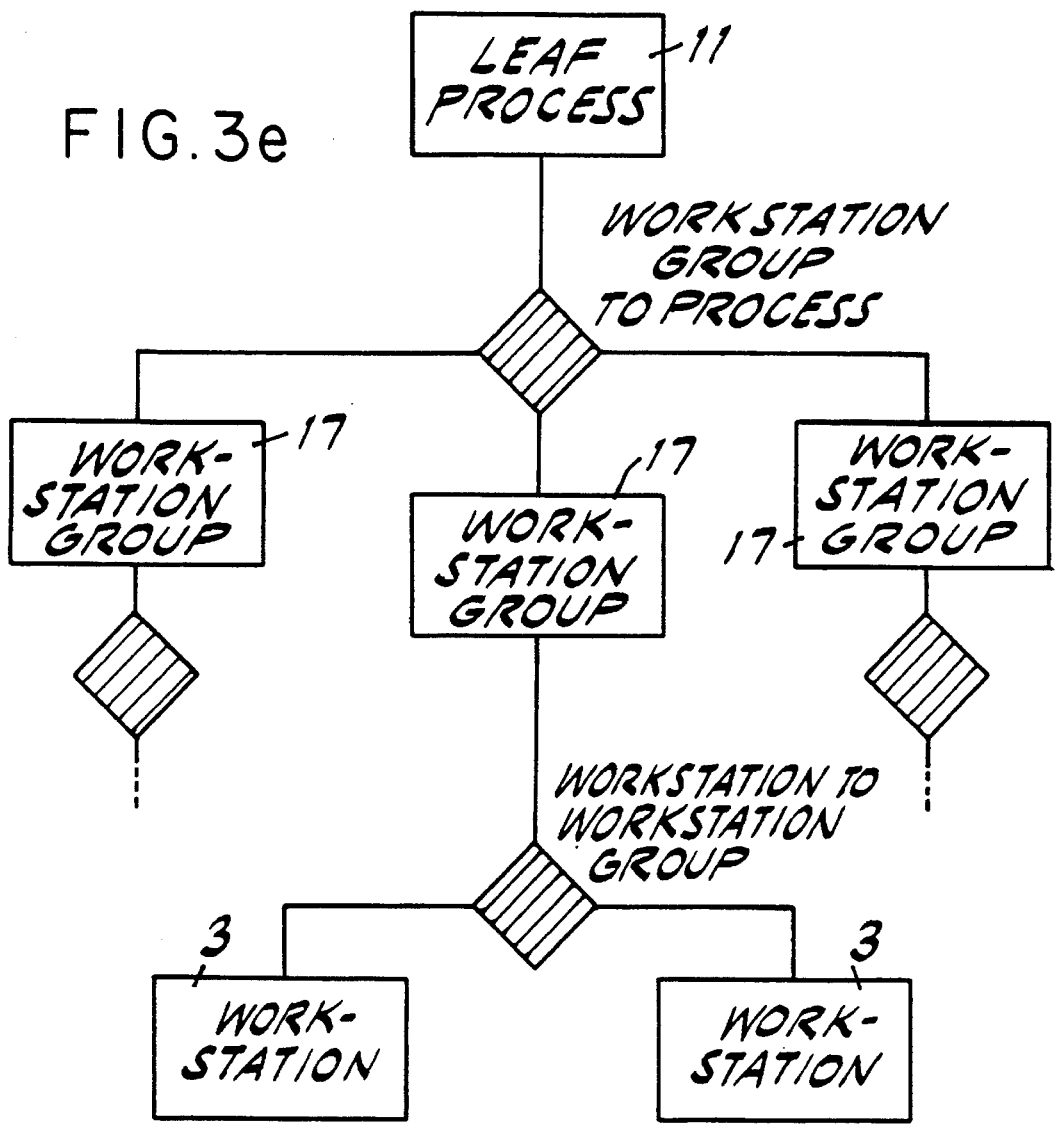
FIGS. 3e and 3f are diagrammatic representations of portions of databases constructed according to entity-relationship models illustrated in FIGS. 3a and 3b.
Figure 3F:
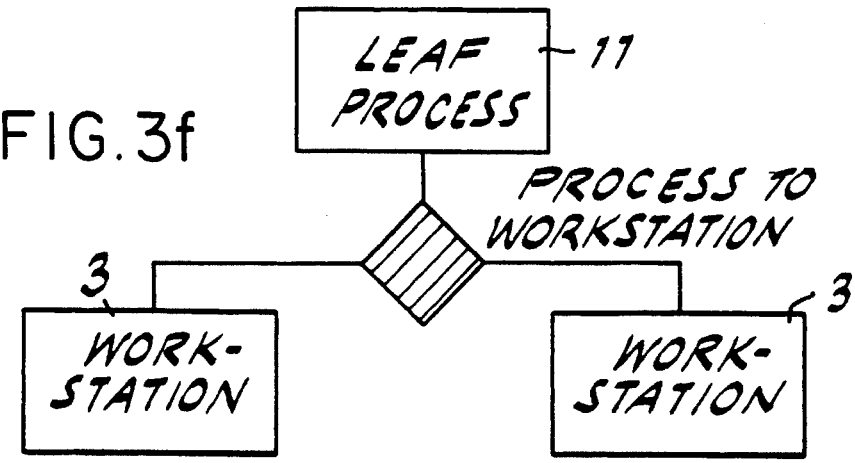

By way of example, FIG. 3e depicts the contents of the Repository 5 as they concern the hardware entity instances of a given system. The Leaf Process instance 11 shown in FIG. 3e can be any of the Leaf Process instances shown in FIGS. 3c or 3d. Each Workstation instance 3 can be any of the Workstations instances 3 depicted in FIGS. 1 and 2. The Workstation Group instances 17 are logical collections of individual Workstation instances 3. The Repository 5 identifies individual Process instances by specific Process attributes stored for each Process instance, as discussed above. Similarly, all attributes generally stored for Workstation Group and Workstation instances, as defined by the SDS Entity-Relationship Model, are stored in the Repository 5 for the specific system in question. Moreover, relationship types specified by the Model associating Processes with Workstation Groups and Workstation Groups with Workstations are stored in the Repository 5 as instances of these relationship types. FIG. 3f depicts an exemplary portion of contents of a Repository 5 for systems which do not employ the Workstation Group entity type. As a consequence the Repository 5 stores no instances of entities or relationships associated with the Workstation Group.

It should be understood that while the Repository 5 can and does contain copies of actual software entity instances which comprise the software application, FIGS. 3c-f depict a portion of the Repository 5 which contains a representation of the software and hardware of the system by virtue of entity attributes. It is this representation of the software and hardware entity instances, according to the Model, which is significant to the SDS process.

The SDS Execution Environment

Prior to proceeding with a discussion of the specific processing of SDS, a short discussion of the SDS execution environment will be useful.

The two types of hardware configurations depicted in FIGS. 1 and 2 show three and two tiers of hardware platforms respectively. In either case however, it is preferred that SDS functions be executed on the mainframe processor 1, 7. This is because mainframe processors are best suited for database-intensive processing. It should be understood that a mainframe processor, while preferred, is not an absolute requirement. Therefore, in the balance of this specification where reference is made "the processor (or node) executing SDS," it should be understood to mean a mainframe only in a preferred embodiment.

The discussion which follows also makes mention of some user interaction with SDS. Generally, this interaction occurs through user operation of a workstation. While such workstation could be any workstation 3 connected to the network, it is convenient that a special workstation or input/output device 6 be used for this purpose.

The Impact Analysis

After a representation of system software and hardware entity instances has been stored in the Repository 5 as a combination of entity and relationship instances of the SDS Entity-Relationship Model, a programmer may make modifications to one or more software entity instances (e.g., Programs, Data Entities, Rules, Components, Windows, etc.) comprising the application. At this point, SDS can be performed beginning with the SDS Impact Analysis.

The Impact Analysis (IA) function of SDS determines what effect changes to certain software entity instances will have on entity instances already defined in the Repository 5 and stored in the warehouse 4. The list of entity instances produced by the IA function, stored in an IA Table (IAT) of the Repository 5, will include all entity instances directly modified by a programmer and will further include all entity instances which may need to be changed as a result of the direct modifications (propagated changes). A programmer once informed of entity instances listed in the IAT must then consider these entity instances and make modifications to them where appropriate.

The IA function could determine all directly modified entity instances simply by adopting a list of such entity instances provided by the programmer. However, it is preferred that a line-by-line comparison be made by the IA function between the unmodified application and the modified application, with all modified entity instances being noted in the IAT.

The IA function determines possible propagated changes by determining all Program instances which call and which are called by the directly modified Program instances. SDS does this by scanning the Repository 5 for all instances of modified Program instances as either the First Participant or Second Participant attribute in Uses relationships. When such a situation is encountered, the corresponding Second or First Participant attribute Program instances respectively are noted in the IAT.

If the entities of View and Field are employed in the SDS Entity-Relationship Model for the application in question, SDS will scan the Repository 5 for all Program instances which Own Views Owned by the modified Program instances. These Program instances are then listed in the IAT. Also, SDS will scan the Repository 5 for all View instances which Include Field instances which are defined to the modified Program instance. Then, all Program instances which Own such View instances are listed in the IAT.

Whether or not the View/Field entities are used, the scanning done by SDS is needed to help identify Program-to-Program data interfaces which may have been altered by a modification to one of the Program instances. Any Program instance which calls or is called by a modified Program instance, or which shares Views/Fields with a modified Program instance (Rule, Component, Window) may have to be modified to account for changes to a data interface.

The IA function of SDS also determines possible propagated changes by identifying all Data Entity instances which have been directly modified by a programmer and then by scanning the Repository 5 for all other Program instances which have access to (i.e., Refer to) such Data Entity instances. This is performed since a programmer may directly modify a Data Entity instance by changing some aspect of data format, but only account for such alteration in, say, the one Program instance known to the programmer to have access to the Data Entity instance. However, because other Program instances may also access the Data Entity instance, these Program instances may need modification.

Thus, a programmer would have to consider all these additional Program instances to determine whether modifications are required as a propagated effect of his direct modifications. The IA function, therefore, provides the programmer with information stored in the IAT of the Repository 5 which delineates the basic information needed to make such determinations.

The above described IA function identifies all directly modified entity instances and all possible entity instances which may need to be changed as a result of direct modification (propagated changes). An alternative form of IA, referred to herein as "IA2", identifies directly modified entity instances in the same way, but identifies entities requiring propagated changes in a different manner. Propagated changes are determined changes based on the significance of given direct modifications to other related entity instances. IA2 is premised upon the fact that a direct change to an entity instance may not affect the executable form of other entity instances which would otherwise be identified by the IA function. These other entity instances, which may be numerous, need not be distributed by SDS. As a result, IA2 can provide a more efficient system for distributing software.

IA2, like IA, identifies all directly modified entity instances by, e.g., performing a line-by-line comparison of modified and unmodified applications. IA2, however, goes further in that it assigns a "Change Class" to the type of change made directly by the programmer. The Change Class is stored in the IAT for each directly modified entity instance.

Change Classes are defined to indicate the significance, in terms of the extent of propagated effect of a given direct modification to an entity instance. For example, a Change Class of 01 might indicate a major propagation effect, while a Change Class of 02 might indicate a more modest effect, if any effect at all. Generally, a Change Class assigned to a modified entity instance is a function of the entity attribute changed by the direct modification. Some entity attributes concern only the directly modified entity, while other attributes concern other entity instances as well as the one modified. Depending on the nature of entity instances and their attributes, Change Classes may be defined to require no, some or many propagated changes.

For a given entity relationship model, Change Classes for an entity type are determined by considering the propagtive effect of changes to the attributes of the entity type. Thus, changes to each attribute of an entity type are considered for their propagative effect —the extent to which other entity types superordinate to the one in questions are affected by such changes. If changes to certain attributes of an entity type share a propagative effect, then such attributes are grouped together in a Change Class.

The following table (Table I) defines Change Classes for the entities of the Entity-Relationship Model useful with certain CASE software. The information presented in Table I is used by IA2 to assign a change class to directly modified entities.

TABLE I

| Entity | Change Class | Meaning |
| --- | --- | --- |
| RULE | 01 | Rule source code has changed. |
| RULE | 02 | Rule EXECENV or ASYNC fields have changed. |
| COMP | 01 | Component source code changed. |
| COMP | 02 | Component EXECENV or ASYNC fields have changed. |
| WINDOW | 01 | Window source code or HELP file has changed. |
| SET | 01 | Set FORMAT, LENGTH, SCALE or SETVAL SYMBOL fields have changed. |
| SET | 02 | SETVAL Relationship text has changed. |
| FLD | 01 | Field FORMAT, LENGTH, SCALE or PIC STORAGE fields have changed. |
| VIEW | 01 | View VUOWNS field has changed. |

As shown in Table I, the first column of information defines entity types. These entity types may have one or more Change Classes. As an example, the entity type "Set" appears twice and has, therefore, two Change Classes associated with it. (A Set is an enumerated list of Values. Each Value is given a symbolic reference. A Set is defined by the following attributes: (1) Set Name, used to uniquely identify the Set; (2) Set Description, used to describe the Set instance; (3) Element Format, used to describe the format of Set elements; (4) Element Length, describing the length of the Set elements; (5) Element Scale, describing the number of decimal places for decimal fields; (6) SETVAL Symbol, describing the name of a given Value in the Set). According to Table I, should any of the Format, Length, Scale or SETVAL Symbol attributes change, by virtue of a modification by a programmer to the Set instance in question, the Set's Change Class will be designated as 01. If, on the other hand, the value of data represented by a given SETVAL Symbol changes, the Change Class associated with that Set is 02.

The significance of a given Change Class to propagated changes is shown in Table II.

TABLE II

Propagative Effect Matrix

| TYPE | CHG CLA | RUL | COM | WIN | VEW | FLD | SET | PARENT RUL | PARENT COM | TOP RUL | PRO |
| --- | --- | --- | --- | --- | --- | --- | --- | --- | --- | --- | --- |
| RULE | 01 | Y | — | — | — | — | — | N | — | Y | Y |
| RULE | 02 | Y | — | — | — | — | — | N | — | Y | Y |
| COMP | 01 | — | Y | — | — | — | — | N | N | Y | Y |
| COMP | 02 | — | Y | — | — | — | — | N | N | Y | Y |
| WINDOW | 01 | N | — | Y | — | — | — | N | — | N | Y |
| SET | 01 | Y | Y | N | — | — | Y | N | N | Y | Y |
| SET | 02 | N | N | N | — | — | Y | N | N | N | Y |
| FLD | 01 | Y | Y | N | Y | N | — | Y | Y | Y | Y |
| VIEW | 01 | Y | Y | N | Y | N | — | Y | Y | Y | Y |
| VALUES | 01 | Y | Y | Y | — | — | Y | Y | Y | Y | Y |

Table II indicates, for a given entity type with a given Change Class (first two columns), other entity types (top of each column), beginning with ("RUL") which will feel a propagated effect from the changed entity. The "Y" entries in the table specify the propagative effect, in terms of superordinate entity types, of changes to an entity instance listed in the "TYPE" column of the table. Depending on the attribute (of the entity instance) directly modified, a given Change Class is implicated (see Table I). Specifically, for a modified Set with a Change Class of 01, Table II indicates, by virtue of the "Y" entries, that all Rules and Components associated with that Set, and the Process, will experience a propagated effect (for example, Rules and Components will have to be reprepared in executable form to account for the changes in the modified Set). In contrast, a modified Set with Change Class 02 need have only itself and the Process reprepared (see "Y" under "Set" and "Pro" column only). That is, Rules and Components associated with that Set need not be reprepared.

For every entry in the IAT indicating a modified software entity instance, IA2 traverses Table II to determine which other entity types may be affected by the modification. In the case of a modified Set of Change Class 01, IA2 identifies the Rule, Component and Process entity types. IA2 then scans the Entity-Relationship representation of the software in Repository 5 to determine all entity instances of the identified entity types (e.g., Rule, Component and Process instances) which are related and superordinate to the modified entity instance in the software hierarchy of the Entity-Relationship representation. Each of these related entity instances is identified in a table for later use in and testing and software distribution. It may be that for any one entity instance in the IAT, another entity instance is identified as having a propagated effect that has been identified previously. In this case, the entity instance need not be identified a second time in the table.

As a result of IA2, a table is built, referred to as the IA2T, which includes all directly modified entity instances as well as all instances which are a result of the propagation of direct modifications. This table serves the SDS like the IAT discussed above.

Software Modification and IA Process Management

In terms of managing the software modification and IA processes (hereinafter, "IA" refers to either IA or IA2 processes), it is preferred that all Program/Data Entity instance modifications, whether direct or propagated, occur not on the Repository 5 or the Warehouse 4 (which are actually "production" environments storing software and relational databases accepted as operational), but rather on a "Development Repository" 5'. This Development Repository 5' is either physically or logically separate from other storage in the computer system in question and allows a programmer to make his direct modifications, and any necessary propagated modifications (as a result of IA) without the danger of contaminating existing storage. Thus, the Development Repository 5' contains the modified software application, as well as a modified entity and relationship representation of the software, if such is called for. It is preferred that the Development Repository 5' be connected to the mainframe processor 1, 7 accessible through a Workstation 3, 6, however, it may simply be a data base local to a given Workstation 3 connected to the network.

It is further preferred that an IA be performed on a copy of the modified application stored in a "Staging Repository" 5", where application quality assurance testing can also be performed. Like the Development Repository 5', the Staging Repository 5" should be logically or physically distinct from other system storage and be connected preferably to the mainframe 1, 7. Also, the Staging Repository 5" can be accessible through any processor/input-output combination, but is typically accessible, as is the Development Repository 5', through a Workstation or Input/Output terminal 3, 6 connected to the mainframe 1, 7. Generally, quality assurance testing of a modified application requires installation of the application in executable form on its intended hardware environment (for example, a three-tiered environment) so that the software can be completely exercised. However, this testing activity in general does not require distribution of the modified software to more than one processor in a given hardware tier.

Quality assurance testing is typically controlled from a single Workstation or input/output device 3, 6 with access to the modified software stored on the Staging Repository 5". For purposes of identification, this Workstation or input/output device 3, 6 will be referred to as the "Quality Assurance Workstation"; it can be located anywhere in the system or network. Of course, quality assurance testing requires that modified software entity instances be converted into executable form for use in testing by the various hardware platforms (tiers) of the system.

As a result of an IA and quality assurance testing, further modification to the application may be required. If so, the further modification should be made preferably on the Development Repository 5', and IA and quality assurance testing should be repeated on the Staging Repository 5". It is preferred that repetition of the IA, quality assurance testing and Program modification sequence be continued until quality assurance testing indicates that the application functions as desired.

When all appropriate entity instance modifications have been made and tested, it is further preferred that the modified and tested application, along with its entity and relationship representation, be moved to the Repository 5 for a final IA. Should this IA indicate no further difficulties, the modified application can be accepted for use as a "base line" or production version. (Should further modifications be required, it is preferred that they be made on the Development Repository 5' with an IA and quality assurance testing occurring at the Staging Repository 5".)

At this point, a "Release" of the modified software entity instances can be built. Since as a result of a final satisfactory IA from the Staging Repository 5" to the Repository 5 both Repositories will contain copies of the same software instances and entity and relationship representation, it will be understood that a Release could be built from either the Staging Repository 5" or the Repository 5. For purposes of explanation, it will be assumed that a Release will be built from the Repository 5.

Building a Release

A Release is defined as the logical unit of work to be distributed by SDS. This logical unit of work in effect is the total difference between the current version of an application as it exists in the Warehouse 4 (i.e., the unmodified version) and a modified application as it exists in the Repository 5 (i.e., all modified software entity instances). The existence of each Release is recorded in a Release Entity Table (RET) in the Repository 5.

A Release is described by a "Release Configuration" which is comprised in part of a Release-to-Entity Relationship Table (RERT) stored in the Repository 5. The RERT contains an entry (or row) for each software entity instance to be distributed by SDS.

The RERT is comprised in part of the list of all software entity instances affected by programmer modification. This list (or column in the RERT) is the result of the SDS IA processing discussed above and is, in effect, the IAT.

The RERT is further comprised of a list of Physical File Names which will be identical to the list of modified entity instances except that should a modified entity instance be comprised of more than one physical file, extensions are employed to augment the entity name thus separating individual physical files associated with a single entity instance. This list of physical files appears as a second column in the RERT.

A third column in the RERT consists of Path Names for each affected entity instance. A Path Name is chosen to be a function of the attributes of a software entity instance.

A fourth column in the RERT consists of Logical File Names which are, as explained below, versions of Physical File Names which separate Physical Files on a Release basis.

The Release Configuration is further comprised of a Release to Process Relationship Table (RPRT). Like the RERT, the RPRT is stored in the Repository 5. The RPRT contains an entry for all Leaf Process instances which are comprised in whole or in part of modified software entity instances. Entries to the RPRT are made by a scan of the Repository 5 for Process instances which are comprised of constituent software entity instances which appear in the IAT for the Release. These associations are provided by the Process to Program, Program to Program and Program to Data relationships discussed above.

Thus, for each Release (as indicated by each entry in the RET) there are entries in associated tables, the RERT and the RPRT. Each of these tables is stored in the Repository 5. Once entries to the RERT and RPRT are made by SDS, the remaining activities required for software distribution are the incorporation of modified entity instances into the Warehouse 4 and the physical transportation of individual software entity instances to their appropriate Workstations 3 (i.e., nodes to which software is to be distributed). It is preferred that the performance of these remaining steps be under the control of one centralized control mechanism, e.g., the mainframe 1, 7 of the three and two tiered computer systems of FIGS. 1 and 2, respectively (operated by a user at an associated workstation 6). In this way, any issues concerning a Release which arise among system users who are located at various workstations 3 can be dealt with in an orderly, organized fashion. Although these steps can be performed in a decentralized fashion, e.g., by multiple controlling processors or by multiple users at Workstations 3 in the network, the centralized control approach is logistically simpler to implement.

Incorporating Modified Entities into the Warehouse

At this point in the SDS process, modified software entity instances have been tested for validity and quality assurance, and entries to the RERT and RPRT tables have been made. The next step is the process of saving the modified software entity instances in the warehouse 4.

When software entity instances are saved in the Warehouse 4, they do not over-write or eliminate previously released versions of the same entity instances. Rather, each modified entity instance is saved on a Release basis. To facilitate storage on a Release basis, SDS defines for each such entity instance a Logical File Name. Logical File Names are versions of entity Physical File Names contained in the RERT. Logical File Names are chosen as functions of both the Physical File Name and the Release Name (from the RET). SDS then creates an "Upload Order" containing a Logical File Name for each Physical File Name in a Release. An "Upload Order Table" (UOT) is maintained in the Repository 5 to store status information about the processing of the Upload Order.

The Upload Order is then transmitted over the network to the node which was responsible for the coordination of quality assurance testing (the Quality Assurance Workstation). This node, in response to this Order, collects the tested software entity instances, which are in executable form, from the test nodes and transmits the software entity instances over the network to the node which controls the Warehouse 4. The software entity instances are then stored in the Warehouse 4 under their Logical File Names as specified by the Upload Order. (Note that such modified software entity instances could have also been sent from either of the Repositories 5, 5" to the Warehouse 4 depending on the embodiment chosen. However the Repositories 5, 5" may not have stored executable forms of the software entity instances. Should software entity instances be stored in non-executable form in the Warehouse 4, they must be converted prior to execution on Workstations 3.) The Logical File Name generation process provides a distinct identity to every version of every entity instance stored in the warehouse 4.

When all software entity instances of the Release are stored in the Warehouse 4, the Upload Order is completed and an "Upload Complete" status is recorded in the UOT stored in the Repository 5.

At this point, modified software entity instances can be distributed to the appropriate Workstations 3 (or nodes) by SDS.

Physical Software Distribution (Release Download)

Once a Release has been successfully uploaded to the Warehouse 4 (so indicated by the Upload Complete status recorded in the UOT), a Release Download can occur. In order to physically distribute software entity instances (i.e.., Download a Release), it is necessary for SDS to determine which Workstations 3 are to receive particular modified software entity instances. This determination is made by SDS's scanning of the tables of the Repository 5 to associate modified software entity instances in a Release to their Process instances, and to associate such Process instances to particular Workstations 3. Specifically, the RPRT for the Release in question is scanned by SDS for all Process instances affected by the Release. SDS searches the Workstation Group to Process relationships of Repository 5 to determine those Workstation Group instances which have access to the Process instances affected by the Release (i.e., those Process instances in the RPRT; see FIG. 3e). Furthermore, SDS searches the Workstation to Workstation Group relationships of Repository 5 to determine those Workstations 3 which are members of the identified Workstation Group instances. (Should the particular computer system in question not employ the Workstation Group entity, SDS would search the Repository 5 to determine directly those Workstations 3 that have access to those Process entities affected by the Release by virtue of the Workstation to Process relationship.)

At this point, a logical relationship has been made between Workstations 3 and Process instances affected by a Release. SDS then scans the RERT to determine all entity instances affected by the Release. Furthermore, SDS scans the Repository 5 to determine all Process instances which are comprised of such entity instances. This is done by tracing, for each such entity instance in the Release (as indicated by the RERT), a path upwards in the software hierarchy, through the relationship and entity instances stored in the Repository 5 (see FIG. 3c), until each Process instance is identified. The Repository 5 therefore provides the association between Processes in the Release and affected entity instances.

The logical relationship between Workstations 3 and Process instances affected by a Release, together with the logical relationship between Process instances affected by a Release and affected entity instance, provides the basis for the creation of specific "Download Orders."

A Download Order is built by SDS for each affected Workstation 3. A Download Order (DO) is a list of the modified software entity instances for each Workstation 3 identified in the technique described above. Each modified software entity instance is identified in a DO by its Physical File Name, Logical File Name and its Path Name. Each DO is identified by a specific DO Number. The DO's are then sent by the node executing SDS through the computer system network for storage at each affected Workstation 3. A "Download Order Table" (DOT) is maintained by the Repository 5 to store status information associated with the processing of DOs.

Each affected Workstation 3 processes a DO in part by retrieving all specified software entity instances (by Logical File Name) from the Warehouse 4 into its own local warehouse database. The local warehouse is storage which is ancillary to that used for storing baseline versions of software entity instances executed by the Workstation 3. The downloaded software entity instances are saved in the local warehouse under the same Logical File Names as used in the warehouse 4. It is preferred that such entity instances be saved in a compressed file (to save space) identified by the associated DO Number. It is further preferred that each Workstation which has stored modified entity instances (in its local warehouse) pass a completion status back through the network to the node executing SDS for storage on the DOT in the Repository 5 to reflect completion of the Download process. At this point, the Release (i.e., modified software entity instances) has been distributed or "downloaded" to those Workstations 3 which require updating.

Release Installation

After modified software entities have been downloaded to a Workstation's local warehouse database, installation of such entity instances can occur at the appropriate time. Typically modified software entity instances are installed for use on every Workstation 3 (that has received the downloaded software entity instances) at the same time. The time chosen should correspond to when such Workstations 3 are not executing the unmodified application.

SDS provides for installation of modified software entity instances through the generation of Install Orders in response to user instructions to install a Release. SDS generates its Install Orders by first searching the DOT for the Release in question in the Repository 5 to determine all Workstations 3 that have received downloaded software (i.e., Download status checked). Next, SDS constructs the Install Orders. These Orders are sent over the network to each identified Workstation 3. (Note that in a three tiered system, the mini-computer 2, receives the Install Orders from the mainframe 7 (which is executing SDS) and directs them to the individual Workstations 3 over the network. However, in a two tiered system the mainframe 1, 7 both generates and directs such Orders to the appropriate Workstations 3.) Each Install Order contains a number which matches the DO Number previously received by the Workstations 3. SDS maintains an "Install Order Table" (IOT) in the Repository 5 to store status information associated with the processing of IOs. Prior to executing each Install Order, each Workstation 3 saves (or "backs out") previous versions of modified software entity instances and store them in compressed a file. This compressed file is preferably identified by the DO Number with an extension indicating its status as a back out file. The entity instances to be backed out are identified by the Workstation 3 by reference to the DO it has previously received and stored.

Once in receipt of an Install Order, and after having backed out previous versions of the modified software entity instances, a Workstation 3 can install the modified software entity instances for regular baseline application processing. The installed entity instances are saved preferably under their Physical File Names listed in the DO for the Workstation 3. They are stored at an address identified in part by their associated Path Names (also indicated in the DO). With installation completed, an "Installation Complete" status is returned by the Workstation 3 in question and this information is saved in the IOT of the Repository 5.

The backed out entity instances stored in the Workstation local warehouse have use when it is desirable to restore a prior Release. To accomplish this, SDS issues a Back Out Order to all affected Workstations 3. The Back Out Order includes a DO Number associated with the Release to be backed out (i.e., deinstalled). The compressed file stored on the local warehouse identified by the corresponding DO Number (with a backout extension) is then used as the file to be installed at the Workstation 3 for baseline processing.

For purposes of Release Downloading, Installation and Back-Out, it is preferred that Workstations 3 have a time interval designated during which such activities can occur. This can be achieved in several ways including the creation of an "SDS Mode" for each Workstation 3 in which each can process Download, Install or Back-Out Orders. The "SDS Mode" could occur at a designated time or at various times determined by SDS (in the latter situation, SDS could issue an SDS Mode command to the various Workstations 3 in the network informing them of when to switch to SDS Mode and for how long to remain in the Mode).

Summary of Detailed Description

The representation of computer system entity instances and the relationships between such instances as stored in the Repository 5 as a result of software design, as well as the construction of special relationships stored in tables in the Repository 5 for the purposes of software distribution, are summarized by way of example in FIG. 4. FIG. 4 depicts the modified software entity instances (programs 18 and Data 19) which are the result of direct and propagated modifications to the software entity instances. All such modified entity instances, whether of the direct or propagated type, originate in the Development Repository 5'. The need for propagated modifications is identified by an IA and quality assurance testing, both associated with the Staging Repository 5". (Should propagated modifications be indicated, these are generated back at the Development Repository 5'.) Whether resulting from direct or propagated modifications, all modified entity instances are listed in a table (IAT) as a result of the IA. Quality assurance testing associated with the Staging Repository 5" occurs with modified entity instances in executable form.

When quality assurance testing is completed, a Release, described by a Release Configuration, can be built by SDS. A Release Configuration is based on two tables, the RERT and the RPRT. The RERT associates Physical File Names and Path Names with each entity instance to be distributed by SDS. The RPRT associates with the Release all affected Leaf Processes 21.

To distribute software, SDS issues certain orders to various nodes in the network. One of these is the Upload Order, issued to the node controlling the Warehouse 4, to collect and store software modified entity instances under a Logical File Name.

Another of these is the Download Order, issued to Workstations 3, to retrieve from the Warehouse 4 particular modified software entity instances and store them in a local warehouse under Logical File Names. The DOs are constructed by SDS from a scan of the RERT, RPRT, and the software and hardware entity and relationship instance representations maintained by the Repository 5.

In order to implement a Release Configuration (i.e., install a Release), Install Orders are created by SDS and sent to all affected Workstations 3. The Workstations 3 implement the Install Orders by saving previous versions of entity instances and by installing newly modified entity instances.

We claim:

1. A method to create and electronically distribute a new release of a software program in a computer system comprising a plurality of processors, a plurality of software programs and a central storage device, at least one of the plurality of processors storing and executing one of the plurality of software programs, each one of the plurality of software programs comprising a plurality of modules, the method comprising the steps of:

modifying, in at least one repository, one of the plurality of software programs;

performing an impact analysis to identify all modules to be modified as a result of the modification to the one of the plurality of software programs;

building, in the at least one repository, a new release of the one of the plurality of software programs by modifying all modules identified in the previous step;

storing the new release in the central storage device;

determining which of the plurality of processors require a copy of the new release;

electronically down-loading the new release from the central storage device to the plurality of processors which require a copy of the new release as determined in the previous step;

issuing a down-load complete message at each of the plurality of processors to which the new release was electronically down-loaded upon completion of the down-load at each of said processors;

transmitting an install order to each of the plurality of processors to which the new release was electronically down-loaded; and installing the new release at each of the plurality of processors to which the new release was electronically down-loaded.

2. The method of claim 1 wherein the step of installing the new release occurs concurrently at each of the plurality of processors to which the new release was electronically down-loaded.

3. The method of claim 1 wherein the step of transmitting an install order takes place only when each one of the plurality of processors to which the new release was down-loaded has issued a down-load complete message.

4. The method of claim 1 wherein the at least one repository includes a development repository and a staging repository, the modifying step being performed in the development repository and the building step being performed in the staging repository.

5. A method to build and electronically distribute a release of a software program in a computer system comprising a plurality of workstations, at least one of the plurality of workstations storing and executing the software program, the software program comprising a plurality of modules, the method comprising the steps of:

identifying modules that require modification;

building a release of the software program by modifying the modules identified in the previous step;

uploading the modules modified in the previous step to a central warehouse;

determining which of the plurality of workstations are using the software program;

issuing a down-load order to each of the plurality of workstations that are using the software program;

storing the down-load order at each of the plurality of workstations that are using the software program;

processing the down-load order at each of the plurality of workstation that are using the software program such that said workstations request each modified module from the central warehouse;

down-loading each modified module from the central warehouse to a local warehouse at each of the plurality of workstations that are using the software program when requested by each said workstation;

issuing a completion status message at each said workstation upon completion of the down-load step at each said workstation;

issuing an install order to each workstation that received each modified module;

at each workstations saving a previous version of each module to be modified;

installing each modified module at each workstation that received the install order by transferring each modified module from the local warehouse to the respective workstation for processing.

6. The method of claim 5 further comprising the step of restoring the previous version of each module that was modified.

7. The method of claim 6 wherein the step of saving a previous version of each module to be modified further comprises saving a previous version of each module to be modified in compressed form at the local warehouse of each workstation.

8. The method of claim 7 wherein the step of restoring the previous Version of each module that was modified further comprises the step of installing the previous version of each modified module at each workstation by transferring the previous version of each modified module from the local warehouse to the workstation for processing.

9. The method of claim 5 wherein the down-load order includes a list of modules that were identified in the identifying step as requiring modification.

10. The method of claim 5 wherein the step of uploading the modules modified further comprises the step of storing the modified modules in the central warehouse without over-writing previously released versions of the modules.

11. The method of claim 5 wherein the step of downloading each modified module from the central warehouse further comprises saving each modified module in a compressed file at the local warehouse of each workstation.

12. The method of claim 5 wherein the step of downloading each modified module from the central warehouse is performed by a file transfer process.

13. The method of claim 5 wherein the step of identifying modules that require modification further comprises the step of performing an impact analysis.

14. The method of claim 5 wherein the step of building a release of the software program further comprises storing modules that comprise the release in a staging repository.

15. The method of claim 5 wherein the computer system further comprises a plurality of software programs.

16. The method of claim 5 wherein each modified module is installed simultaneously at each of said workstations.

17. A method to build and electronically distribute a release of a software program in a computer system comprising a plurality of workstations, at least one of the plurality of workstations storing and executing the software program, the software program comprising a plurality of modules, the method comprising the steps of:

identifying modules that require modification;

building a release of the software program by modifying the modules identified in the previous step;

uploading the modules modified in the previous step to a warehouse;

determining which of the plurality of workstations are using the software program;

issuing a down-load order to each of the plurality of workstations that are using the software program;

transferring, when requested by each of the plurality of workstations that are using the software program, each modified module from the warehouse to a local warehouse at each of said workstations;

issuing an install order to each workstation that received each modified module; and installing each modified module at each workstation that received the install order by transferring each modified module from the local warehouse to the workstation for processing.

18. The method of claim 17 wherein the down-load order includes a list of modules that were identified in the identifying step as requiring modification.

19. The method of claim 17 wherein the step of uploading the modules modified further comprises the step of storing the modified modules in the warehouse without over-writing previously released versions of the modules.

20. The method of claim 17 wherein the step of identifying modules that require modification further comprises the step of performing an impact analysis.

21. The method of claim 17 wherein the computer system further comprises a plurality of software programs.

22. The method of claim 17 wherein each modified module is installed simultaneously at each workstation to which the modified modules were transferred.

* * * * *